United States Patent [19]

Davidson, Jr.

[11] 4,286,914
[45] Sep. 1, 1981

[54] MEANS AND METHOD FOR CONNECTING LARGE PIPE

[76] Inventor: Douglas M. Davidson, Jr., 5320 NW. 16 St., Lauderhill, Fla. 33313

[21] Appl. No.: 77,311

[22] Filed: Sep. 20, 1979

Related U.S. Application Data

[63] Continuation of Ser. No. 861,404, Dec. 16, 1977, abandoned.

[51] Int. Cl.³ .............................................. B66F 11/00
[52] U.S. Cl. ................................... 414/460; 405/170; 414/747; 414/786; 414/910
[58] Field of Search .............. 414/459, 460, 461, 589, 414/747, 786, 910; 405/170; 29/781

[56]     References Cited
U.S. PATENT DOCUMENTS

| | | | |
|---|---|---|---|
| 1,195,147 | 8/1916 | Mitchell | 414/747 |
| 2,333,208 | 11/1943 | Spear | 414/460 |
| 2,959,310 | 11/1960 | Meister | 414/459 |
| 3,267,682 | 8/1966 | Robley | 414/747 X |
| 3,688,931 | 9/1972 | Tax et al. | 414/460 |
| 3,759,409 | 9/1973 | Wenzel et al. | 414/460 |
| 4,020,952 | 5/1977 | Scodino | 414/747 |
| 4,050,589 | 9/1977 | Dolza | 414/747 |

FOREIGN PATENT DOCUMENTS

| | | | |
|---|---|---|---|
| 1948051 | 4/1971 | Fed. Rep. of Germany | 414/460 |
| 1246266 | 10/1960 | France | 405/170 |
| 772368 | 4/1957 | United Kingdom | 414/747 |

Primary Examiner—Leslie J. Paperner
Attorney, Agent, or Firm—Malin & Haley

[57]     ABSTRACT

A self-propelled vehicle having a pair of grappling devices supported from the vehicle and powered by an operating device. The vehicle while maintaining an elongated pipe within the grappling device moves in a horizontal direction to connect the held pipe with previously laid pipe. While the vehicle moves toward the previously laid pipe, the carried pipe may be moved to the left or right or simultaneously raised or lowered to align it with the previously laid pipe. When slip joint pipe is being laid, it may be forcibly connected to the previously laid pipe by the kinetics of the vehicle. When slip joint pipe is laid, no other means need be used to keep the pipes fastened together other than the frictional force caused by the forceable insertion of one pipe in another.

7 Claims, 5 Drawing Figures

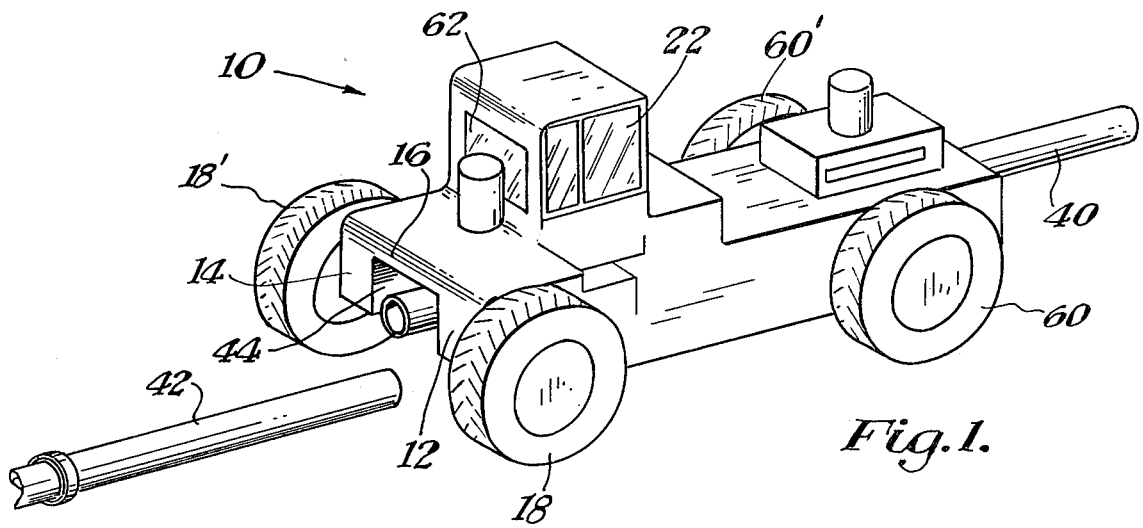
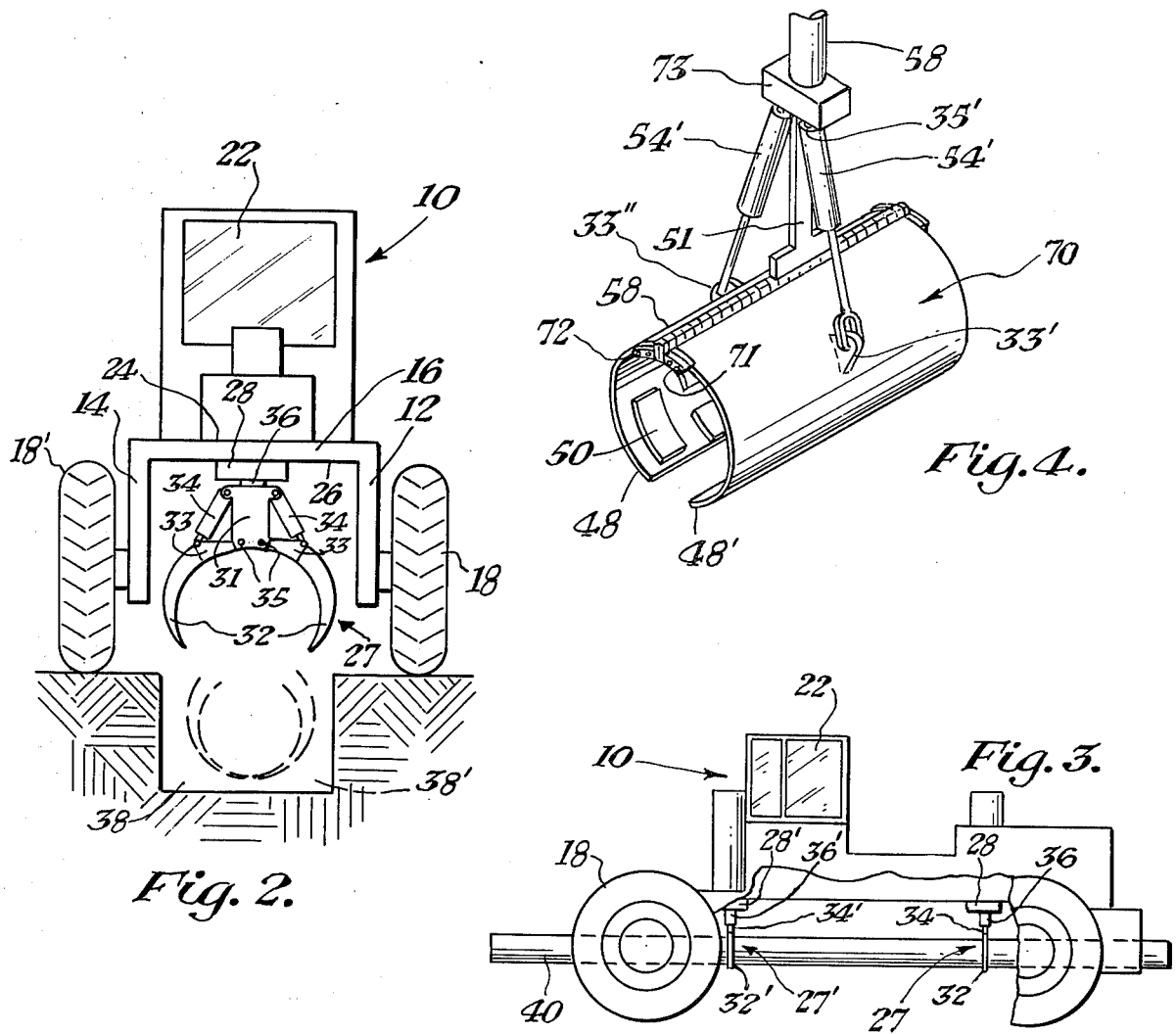

MEANS AND METHOD FOR CONNECTING LARGE PIPE

This is a continuation of Application Ser. No. 861,404, filed Dec. 16, 1977, abandoned.

BACKGROUND OF THE INVENTION

Although the invention described and claimed herein may be directed to a variety of applications, it is herein described in connection with application for laying connecting pipe in a generally flat plane and forcing slip joint pipe together.

Various types of devices are commonly used for handling large size pipes. Some devices use cable operated hooks which are inserted in both ends of the pipe and are generally supported by a cable from the end of a movable boom. Other devices are either cable operated or hydraulic operated tongs attached to the end of an articulated boom which in turn is attached to the top or sides of a vehicle. Examples of these devices are described in the following U.S. Pat. Nos. 2,789,716 and 3,978,990.

When a pipe handling device of the prior art is used, it is difficult to prevent the load from swaying or twisting while being elevated for movement of the pipe into aligning position. This swaying and twisting movement prevents the transported pipe from being properly aligned with other pipe while the vehicle and pipe are in motion. Large work forces were needed to align the pipes for insertion of one pipe into another.

SUMMARY OF THE INVENTION

The present invention which overcomes the disadvantages inherent in the conventional methods of laying large pipe as heretofore mentioned comprises a self-propelled vehicle having a pair of grappling devices supported from the vehicle and powered by an operating device. The vehicle maintains an elongated pipe within the grappling devices, which may be moved to the left or right by the vehicle ground connecting means (wheels) and simultaneously raised or lowered by independant movement of the grappling devices to align the pipe with the previously laid pipe. When slip joint pipe is laid, the vehicle may be used to forcibly connect the pipe to previously laid pipe by the kinetics of the vehicle.

An object of the present invention is to provide a pipe laying device in which a pipe may be carried in a generally horizontal position, below the vehicle, and thus prevent swaying of the pipe during movement of the vehicle to aid in aligning the pipe with previously laid pipe.

Another object of the present invention is to provide a pipe removing vehicle in which the pipe connecting means may be attached to the last connected pipe and removed by moving the vehicle away from the pipe line.

A further object of the invention is to provide vertical and lateral movement of the end of a pipe carried by the vehicle by movement of the grappling devices and the vehicle through its steering mechanism.

A further object of the invention is to provide a device which may partially or fully straddle the laid pipe, thus allowing pipe being carried within and below the vehicle to be connected to previously laid pipe by movement of the vehicle.

Still another object of the invention is to provide a device in which the operator is directly above the load, thereby allowing both vertical and horizontal movement of the carried pipe, thus facilitating rapid connections or disconnections of pipe with only operator action.

A further object of the invention is to utilize the kinetic energy of the vehicle to connect slip joint pipes.

An additional object of the invention is to allow the raising and lowering of the distal end of a connected piece of slip joint pipe to a pipe line to aid in disengagement of the pipe from a pipe line as the vehicle moves away from the pipe line.

In accordance with these and other objects which will be apparent hereinafter, the instant invention will now be described with particular reference to the accompanying drawings.

BRIEF DESCRIPTION OF THE DRAWINGS

The present invention is herein described and illustrated with respect to particular preferred embodiments thereof, as illustrated in the accompanying drawings wherein:

FIG. 1 is a perspective view of the present invention of a pipe laying vehicle shown with wheels and with a pipe carried in a raised position.

FIG. 2 is a rear elevational view of the embodiment of FIG. 1.

FIG. 3 is a side view of the present invention, partly in section, showing a pipe being held in an elevated position by a pair of arms with co-acting jaws.

FIG. 4 is a perspective view of another embodiment of the lifting means.

DESCRIPTION OF THE PREFERRED EMBODIMENT

Figure 5:
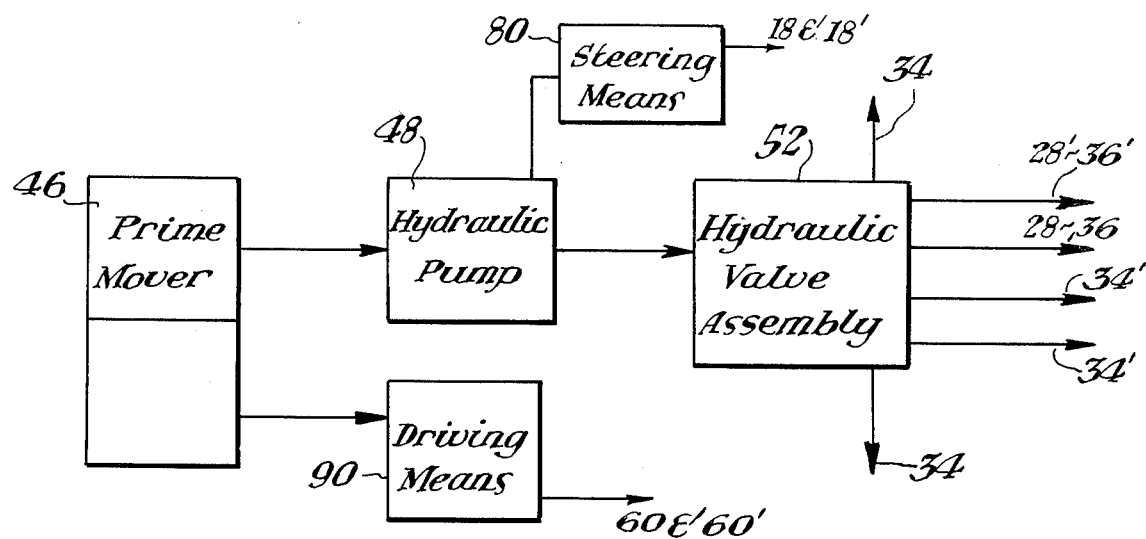
FIG. 5 is a block diagram of the control system.

Referring to FIGS. 1, 2 and 3 of the drawings, it will be seen that the present device comprises a self-propelled motorized vehicle 10 with driving means (not shown) connected to wheels 18, 18', 60, and 60' all or partially driven by any well known motor-transmission means (not shown). FIGS. 1 and 3 show the front of the vehicle at the left and the rear of the vehicle at the right. The vehicle may have vertical body or support walls 12 and 14 connected together by horizontal member 16. Tracks may be used instead of wheels 18, 18', 60, and 60'. Member 16 has an upper side 24 with an operating station 22 supported thereon. The operating station or cab 22 permits the vehicle operator an unobstructed view of the load held beneath the vehicle 10. The cab 22 may be placed in a more forward position or may be supported higher above the member 16. Member 16 has an opposite side 26 which supports a plurality of operating means 27 and 27' as shown in FIG. 3. As shown in FIGS. 2 and 3, each of the operating means 27 and 27' (grappling system) includes a hydraulic piston system having housing 28 and a movable piston 36, and housing 28' and movable piston 36'. The hydraulic piston systems 27 and 27' move the arms 32 and 32' up and down and open and close the grapples. The operating means 27 and 27' includes articulated hydraulic arms 32 and 32' respectively that are pivotly connected to stationary member 31 by pivot pins 35 to move the upper portion 33 with arms 32 and 32'. Stationary member 31 is attached to the vertically moving piston 36 as shown in FIG. 2. The arms or holding means 32 and 32' are connected to the distal end of stationary member 31 by pins 35. Arms 32 and 32' may be wide as shown in FIG. 4 by arms 48 and 48'. Each hydraulic pistons 34 shown in FIG. 2 is connected between a proximal portion of stationary member 31 and an upper portion of an arm 32 designated by numeral 33. Upper portion 33 is fixed to the lower portion of each arm. The same arrangement may be used for the front grapple shown in FIG. 3.

Sources of hydraulic power for operating the hydraulic piston system 28, 36 and 28', 36' and the clamping pistons 34 and 34' may be any conventional hydraulic systems such as now used in bulldozer vehicles for clamping type means. The hydraulic power is connected to the operating means 27 and 27' to move pistons 36 and 36' in a substantially vertical (up and down) operation and to move the movable portion of pistons 34 and 34' to move the arms 32 and 32' from the position shown in FIG. 2 to the phantom position shown in FIG. 2.

FIG. 4 shows illustration of the holding means with large clamping means 70 with arms 48 and 48' having flexible grips 50 that may be narrower than shown which aid in grasping a pipe. Grips 50 may be a brake lining material. The operating means includes a piston 58 that moves the assembly up and down, as piston system 28 and 36 in FIG. 2. The upper ends of pistons 54 and 54' in FIG. 4 are connected to stationary member 51 that is fixed to stationary member 58 and fixed to stationary member 73. Member 58 has hinge pins, two of which are shown as 71 and 72 which allow arms 48 and 48' to open and close the jaws. The lower end of the movable portion of pistons 54 and 54' are connected to the arms 48 and 48' at 33' and 33". The longitudinal length of the clamping means 70 is preferrable 18 inches.

The self-propelled motorized vehicle 10 is driven over a pipe 40 so that said pipe 40 is below the cavity 44 formed by said walls 12 and 14 and said upper member 16. The operator may then independently lower the pistons 36 and 36' to lower the grapple system and clamp the arms 32 and 32' about the pipe 40 to grasp the pipe 40 by independently operating pistons 34 and 34'. The operating means 27 and 27' includes piston 36 and 36' to independently move the pipe in a vertical direction. Two pairs of pivotably mounted co-acting jaws 32 and 32' grasp the pipe 40 while said pipe 40 is being lifted or lowered vertically by said operating means 27 and 27' into said cavity 44 of said vehicle 10.

The vehicle 10 is then driven in a colinear direction toward previously laid pipe 42 and after adjusting the height of pipe 40 by pistons 36 and 36' as stated above and aligning the pipe in relation to pipe 42 in a horizontal plane by any well known steering gear or hydraulic mechanism 80 connected to wheels 18 and 18' as shown in FIG. 5.

After alignment, a dresser pipe coupling or like, may be used to attach the pipes 40 and 42 together. When slip joint pipes are being coupled, the pipes are forcibly connected to one another by the moving vehicle 10 toward the previously laid pipe 42 to connect the pipes by the kinetic force of said vehicle 10. Thereafter, the jaws are released and the vehicle is moved away to repeat the procedure to provide a connected pipe line.

The pipe 40 may be removed by moving the vehicle over the pipe, lowering the jaws, removing pipe connecting means and grasping the pipe and thereafter raising the pipe and removing it from the pipe line. When slip joint pipe is to be removed, the rear piston 36 may be raised and lowered slightly to loosen pipe 40 while moving the vehicle in a reverse direction to dislodge the slip joint pipe connection.

The operator of said vehicle 10 looks through window 62 is the only person needed to align or connect pipe 40 or disconnect slip joint pipe 40. No other means or personnel need be used to keep the slip joint pipes fastened together other than the frictional force caused by the insertion of one pipe into another. The structure shown in FIG. 4 and FIGS. 2 and 3 will be constructed to withstand the longitudinal connecting force in regard to connecting slip joint pipe when the kinetic energy of the vehicle is used to connect one pipe to another.

This device is especially useful to engage and disengage pipe on land fill operations. This device and method allows a minimum number of personnel in operation.

FIG. 5 shows a block diagram of a well known propulsion and control system comprising a prime mover 46, such as a diesel engine that drives vehicle 10, and a driving means 90 including a transmission connected to drive wheels 60 and 60' for movement of the vehicle 10 in a forward or reverse direction. The prime mover drives a hydraulic pump 48. The hydraulic pump 48 may be used to steer wheels 18 and 18' through steering means or control mechanism 80. The hydraulic pump drives pistons 36 and 36' and the movable pistons in pistons 34 and 34' through a hydraulic valve assembly 52.

Assembly 52 may include any well known valving system that is connected in the cab of the vehicle. The hydraulic valve assembly includes a plurality of hydraulic valves that let the hydraulic fluid move into and out of the pistons to operate pistons by extending the piston in an outward direction or moving the piston inward.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A conduit laying, connecting, disconnecting, and removing vehicle for connecting and disconnecting conduit, comprising:

ground engaging means for moving across the ground, a body connected to said ground engaging means, said body including generally flat horizontal support means, downwardly extending vertical side support connected to said horizontal support means for forming a conduit space, a driver station connected to said horizontal support means, steering means located within said driver station and connected to said ground engaging means for directing said vehicle to the left or right, power means connected to said vehicle and said ground engaging means for propelling said vehicle over the ground, said power means including driving control means for moving said vehicle across the ground positioned in said driver station and connected to said power means, said driver station positioned in a forward position on said body to include a seat positioned to place a driver in a position with a view of the forward end of said conduit to guide said conduit into a second pipe to connect said conduit to said second conduit, a pair of operating means movably attached to and supported by said body for maintaining fixed vertical line position between said vehicle and said operating means, said pair of operating means positioned for independent vertical movement up and down within said conduit space for raising and lowering said conduit supported in a generally horizontal plane, said pair of operating means for independent movement relative to each other, said pair of operating means connected to said power means for moving said conduit, and said pair of operating means for moving said conduit, and said pair of operating means including grasping control means positioned in said driver station, and grasping means for firmly gripping the outside of said conduit to align said conduit and connect and disconnect said conduit by exerting the kinetic force of the moving vehicle in a direction along the center line of said conduit, and said grasping means connected to said power means and grasping control means for firmly grasping the sides of said conduit during forced connecting and disconnecting of said conduit to prevent relative movement between said grasping means and said conduit and for carrying and positioning said conduit in a vertical plane.

2. A conduit laying, connecting, disconnecting and removing vehicle for connecting and disconnecting conduit according to claim 1, wherein:

said grasping means having at least two sets of independently operated opposed jaws for forcibly grasping and holding said conduit stationary with respect to said vehicle as said vehicle movement connects or disconnects said conduit.

3. A fast method for laying, connecting, disconnecting and removing conduit comprised of the steps of:

arranging a pair of vertically movable conduit holding means to hold a conduit longitudinally below the supporting structure of a motorized vehicle in order to pick up the conduit, independently moving each said holding means vertically to releasably grasp the conduit and raise each end of said conduit in a vertical plane while said conduit is grasped by said holding means to fix the relative position between said conduit and said vehicle when connecting the conduit to a previously placed conduit, said holding means is moved toward and away from said vehicle, and moving and steering the motorized vehicle in a colinear direction toward a previously placed conduit, while independently grasping and adjusting the height of the conduit in said holding means to align the center line of the conduit in respect to the center line of the previously placed conduit, forcibly connecting the grasped conduit into said previously positioned conduit by kinetic energy of the moving vehicle, releasing said conduit from said holding means.

4. A method as set forth in claim 3, wherein:

said conduit is disconnected by being picked up and grasped by said holding means, and then moving said vehicle along the center line of said conduit to disconnect said conduit by kinetic energy of the moving vehicle, dropping said conduit.

5. A self-propelled conduit laying, connecting, disconnecting and removing vehicle for traveling across the ground for aligning and forcibly connecting and disconnecting conduit, comprising:

ground engaging means for moving the vehicle over the ground, a body connected to said ground engaging means, said body including a generally longitudinal flat horizontal support member connected to at least two downwardly extending vertical side members for forming a longitudinal cavity therebetween, a driver station positioned on said body to provide a driver with a clear viewing position of the forward end of said conduit to align and connect the forward end of said conduit to previously laid conduit, piston operating means attached to and supported from said support member within the longitudinal cavity, said piston operating means for vertical movement and extendable at least in part below said ground, said piston operating means for maintaining the vertical line position of the conduit;

holding means carried by said piston operating means, said holding means movably positionable along a vertical line with respect to said body to forcibly grasp said conduit to align and connect said conduit to like conduit by the exerted kinetic force of the moving vehicle, a power means connected for driving said vehicle, operating said piston operating means and forcibly grasping said conduit to prevent relative movement between said conduit and said vehicle during connecting and disconnecting, and control means connected to said driver station and ground engaging means, said piston operating means, said holding means, and said power means for operating said vehicle.

6. A pipe laying vehicle for transporting pipe from above the ground to a trench below the ground and connecting a pipe to a previously laid pipe and for disconnecting pipe below the ground and transporting it to above the ground, comprising:

a vehicle body having a front pair of spaced apart wheels and a rear pair of spaced apart wheels, said vehicle body defining a longituditual working cavity;

a front hydraulic piston vertically oriented and extendable a predetermined distance below the ground and connected to said vehicle body;

a rear hydraulic piston vertically oriented and extendable a predetermined distance below the ground and connected to said vehicle body;

a front grapple means for releasably engaging a portion of the conduit whereby the conduit is fixed therein to prevent sliding movement of the conduit along the longitudinal axis of the conduit; and connected to said front hydraulic piston;

a rear grapple means for releasably engaging a portion of the conduit whereby the conduit is fixed therein to prevent sliding movement of the conduit along the longitudinal axis of the conduit; and connected to said rear hydraulic piston;

a driver station positioned on said body to provide a driver with a clear viewing position of the forward end of the conduit when said front hydraulic piston is extended below the ground;

a power means for driving said vehicle and connected thereto, for operating said front hydraulic piston and said rear hydraulic piston and said front grapple means and said rear grapple means;

a driver control means operably connected to said driver station, said vehicle body, said front hydraulic piston, said rear hydraulic piston, said front grapple means and said rear grapple means, and said power means for operating said vehicle whereby the conduit may be grasped and aligned by said front and rear grapple means and connected or disconnected by the kinetic force of the moving vehicle in the direction along the longitudinal axis of the conduit.

7. A method for laying, connecting, disconnecting and removing conduit in a ditch comprising the steps of:
- arranging a pair of vertically movable conduit holding means to hold a conduit longitudinally below the supporting structure of a motorized vehicle in order to pick up the conduit,
- independently moving each said holding means vertically to releasably grasp the conduit and raise each end of said conduit above the ground in a vertical plane,
- moving and steering the motorized vehicle in a colinear direction over the ditch toward a previously placed conduit,
- lowering said conduit into said ditch by independently adjusting each said holding means;
- aligning said conduit with a previously placed conduit;
- forcibly connecting the grasped conduit into said previously positioned conduit by kinetic energy of the moving vehicle;
- releasing said conduit from said holding means.

* * * * *